United States Patent
Chen et al.

(10) Patent No.: US 12,020,070 B2
(45) Date of Patent: Jun. 25, 2024

(54) MANAGING COMPUTER WORKLOADS ACROSS DISTRIBUTED COMPUTING CLUSTERS

(71) Applicant: RED HAT, INC., Raleigh, NC (US)

(72) Inventors: Huamin Chen, Westboro, MA (US); Ricardo Noriega De Soto, Madrid (ES)

(73) Assignee: RED HAT, INC., Raleigh, NC (US)

( * ) Notice: Subject to any disclaimer, the term of this patent is extended or adjusted under 35 U.S.C. 154(b) by 596 days.

(21) Appl. No.: 17/221,236

(22) Filed: Apr. 2, 2021

(65) Prior Publication Data
US 2022/0318065 A1 Oct. 6, 2022

(51) Int. Cl.
G06F 9/46 (2006.01)
G06F 9/50 (2006.01)

(52) U.S. Cl.
CPC .................. *G06F 9/5027* (2013.01)

(58) Field of Classification Search
CPC ..................................................... G06F 9/5027
USPC ......................................................... 718/104
See application file for complete search history.

(56) References Cited

U.S. PATENT DOCUMENTS

| | | | | |
|---|---|---|---|---|
| 8,495,206 B2* | 7/2013 | Borghetti | ............. | G06F 9/5072 709/224 |
| 9,513,935 B2* | 12/2016 | Cardonha | ........... | G06F 9/44505 |
| 9,912,607 B2* | 3/2018 | Steinder | ............... | G06Q 10/063 |
| 10,355,946 B1* | 7/2019 | Dolas | .................. | H04L 43/0817 |
| 10,581,964 B2* | 3/2020 | Einkauf | .................. | H04L 67/10 |
| 10,791,063 B1* | 9/2020 | Florissi | ................. | H04L 47/783 |
| 10,791,168 B1* | 9/2020 | Dilley | .................... | H04L 67/288 |
| 10,997,052 B2* | 5/2021 | Khosrowpour | ..... | G06F 11/3476 |
| 11,500,663 B1* | 11/2022 | Gupta | ........................ | G06F 8/63 |
| 11,755,458 B2* | 9/2023 | Richardson | .......... | G06F 11/3452 717/128 |
| 2012/0284408 A1* | 11/2012 | Dutta | .................. | H04L 67/1001 709/226 |
| 2013/0086593 A1* | 4/2013 | Sloma | ................... | G06F 9/5033 718/105 |
| 2014/0122387 A1* | 5/2014 | Chi | ......................... | G06N 5/04 706/12 |

(Continued)

FOREIGN PATENT DOCUMENTS

WO 2019135703 A1 7/2019

OTHER PUBLICATIONS

European Patent Application No. 21181900.8, Extended European Search Report dated Dec. 10, 2021, 12 pages.

(Continued)

*Primary Examiner* — Mehran Kamran
(74) *Attorney, Agent, or Firm* — Kilpatrick Townsend & Stockton LLP

(57) ABSTRACT

Computer workloads can be managed across distributed computing clusters according to some aspects of the present disclosure. In one example, a system can receive a request from a workload manager for identifying a computing cluster to which to assign a workload. The system can determine that the workload is to be assigned to a particular computing cluster among a plurality of computing clusters based on historical information about replica deployment by the particular computing cluster. The system can then transmit a response to the workload manager for causing the workload manager to assign the workload to the particular computing cluster.

20 Claims, 6 Drawing Sheets

(56) References Cited

U.S. PATENT DOCUMENTS

| | | | |
|---|---|---|---|
| 2014/0207932 A1* | 7/2014 | Hyo | H04L 63/08 709/223 |
| 2016/0019245 A1* | 1/2016 | Padmanaabhan | G06F 16/86 707/609 |
| 2016/0328273 A1* | 11/2016 | Molka | A61B 8/00 |
| 2017/0235603 A1* | 8/2017 | Baughman | G06Q 10/101 718/105 |
| 2017/0235616 A1* | 8/2017 | Baughman | H04L 67/52 718/104 |
| 2018/0074855 A1* | 3/2018 | Kambatla | G06F 9/4881 |
| 2018/0241802 A1* | 8/2018 | Bernat | H04L 43/0894 |
| 2019/0147089 A1* | 5/2019 | Megahed | H04L 41/5096 707/718 |
| 2019/0205172 A1* | 7/2019 | Arolovitch | H04L 41/12 |
| 2019/0327303 A1* | 10/2019 | Chen | H04L 67/1097 |
| 2019/0386889 A1* | 12/2019 | Noorshams | H04L 67/10 |
| 2020/0167195 A1* | 5/2020 | Aronovich | H04L 67/1036 |
| 2020/0233724 A1* | 7/2020 | Schmidt | G06F 11/3466 |
| 2020/0267053 A1* | 8/2020 | Zheng | H04L 67/1008 |
| 2020/0364086 A1* | 11/2020 | Gavali | G06F 11/3414 |
| 2020/0396311 A1* | 12/2020 | Shimamura | H04L 67/5681 |
| 2021/0224102 A1* | 7/2021 | Desikachari | G06F 11/3452 |
| 2021/0286699 A1* | 9/2021 | Jha | G06F 11/3452 |
| 2021/0342712 A1* | 11/2021 | Ferreira | G06F 16/11 |
| 2021/0373951 A1* | 12/2021 | Malladi | G06F 12/0292 |
| 2022/0058098 A1* | 2/2022 | Hegde | G06F 11/3409 |
| 2022/0318065 A1* | 10/2022 | Chen | G06F 9/5072 |
| 2023/0012487 A1* | 1/2023 | Makaya | G06F 9/5027 |
| 2023/0221936 A1* | 7/2023 | Berra | G06F 11/302 717/177 |
| 2023/0325256 A1* | 10/2023 | Sun | G06N 3/088 718/1 |

OTHER PUBLICATIONS

Rauscha, T., et al., "Optimized Container Scheduling for Data-Intensive Serverless Edge Computing," Distributed Systems Group, 2020, https://www.researchgate.net/publication/343508665_Optimized_container_scheduling_for_data-intensive_serverless_edge_computing.

Hong, C., et al., "Resource Management in Fog/Edge Computing: a Survey," Chung-Ang University and Queen's University Belfast, 2018, https://arxiv.org/pdf/1810.00305.pdf.

* cited by examiner

MANAGING COMPUTER WORKLOADS ACROSS DISTRIBUTED COMPUTING CLUSTERS

TECHNICAL FIELD

The present disclosure relates generally to managing computer workloads. More specifically, but not by way of limitation, this disclosure relates to managing computer workloads across distributed computing clusters.

BACKGROUND

Distributed computing environments can include multiple computing clusters that can perform various functions. One common type of distributed computing environment can be a telecommunications system, such as a cellular network for facilitating voice and data communications via mobile devices. Such telecommunication systems can include multiple computing clusters configured to support voice and data services. For example, a telecommunication system can include computing clusters running software components that support video conferencing, web surfing, voice communications, and other workloads. In some cases, the computing clusters may be edge clusters physically located at the physical edges of the telecommunication system.

The computing clusters can execute various types of software components to implement their functionality. Examples of such software components can include serverless functions and microservices. A serverless function can be an ephemeral, self-contained, discrete piece of code (e.g., set of logic or operations) configured to perform a particular task when executed and then become dormant when execution completes. One example of a serverless function can be a Lambda function in Amazon Web Services®. A microservice can be a self-contained stateless service that is generally designed to perform a specific task. Microservices can communicate with each other through well-defined application programming interfaces (APIs) in order to work together to generate responses to end-user requests. Serverless functions and microservices may be individually "owned" or developed by different developers and deployed independently of each other, which can provide improvements to scalability, robustness, isolation, and development time over conventional monolithic software-applications.

The computing clusters can automatically deploy and scale up or down the software components depending on the cluster's assigned workloads. This can be referred to as auto-scaling. Scaling up a software component can involve increasing the number of its replicas that are running in a computing cluster at a given point in time, for example to handle a larger workload. A replica can be an instance of the software component. Scaling down a software component can involve decreasing the number of its replicas that are running in a computing cluster at a given point in time, for example to conserve computing resources when handing a smaller workload.

DETAILED DESCRIPTION

Figure 1:
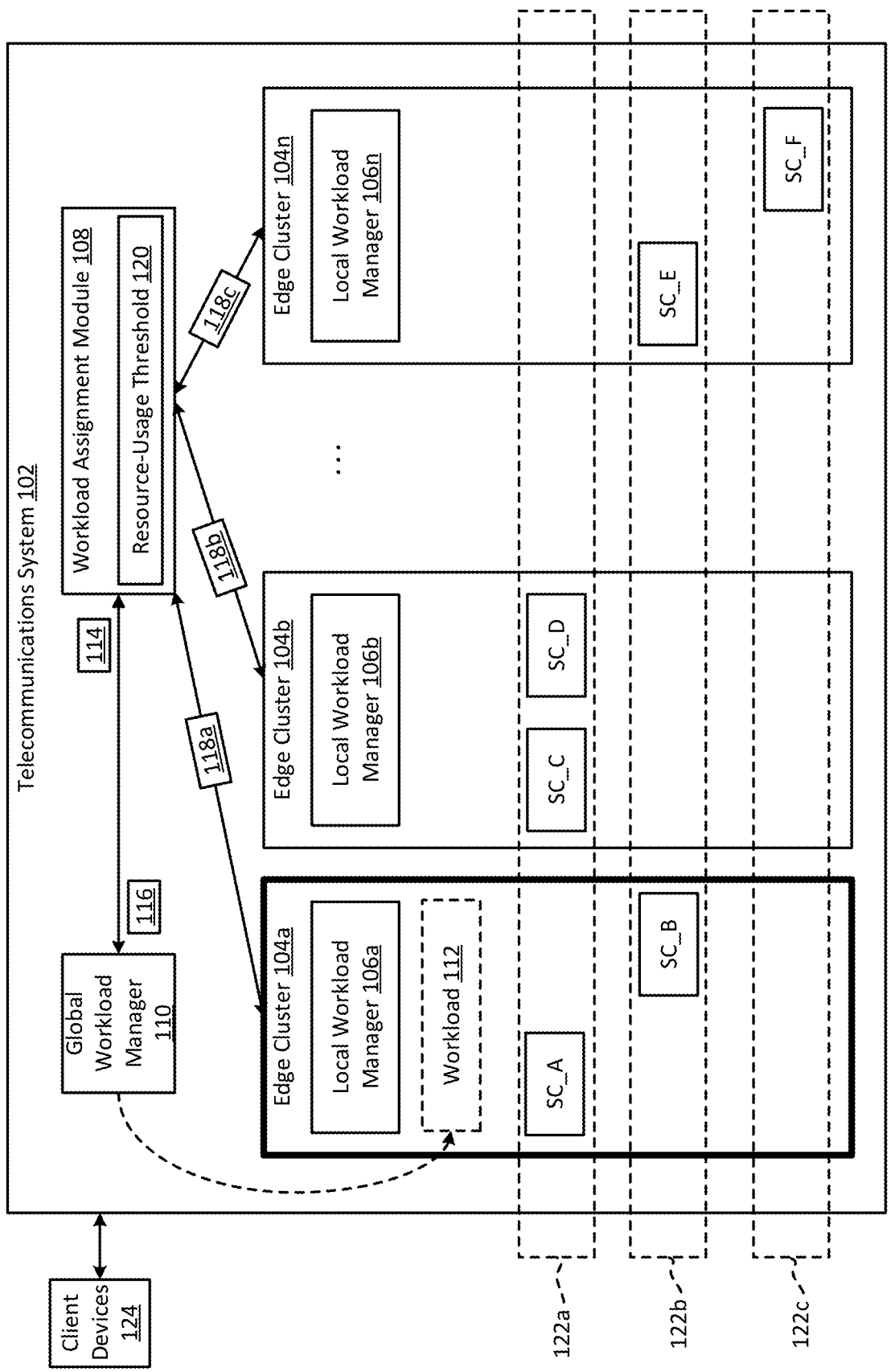
FIG. 1 shows a block diagram of an example of a system in which computer workloads can be managed according to some aspects of the present disclosure.

Distributed computing environments can include multiple computing clusters to which various workloads can be assigned. Because the computing clusters are distributed from one another, it may be desirable to determine the resource availability of each computing cluster so that the distributed computing environment can select a computing cluster with sufficient capacity to handle a given workload. But conventional approaches to determining resource availability are often slow and consume significant amounts of computing resources, such as processing power, memory, and network bandwidth. For example, the distributed computing environment can include a management module that can rapidly (e.g., every millisecond) and repeatedly poll the computing clusters in an effort to determine their resource availability in substantially real time. But such polling can consume a significant amount of network bandwidth as well as the computing resources of the computing clusters. Additionally, the ephemeral nature of the software components (e.g., serverless functions) executing on the computing clusters, in conjunction with network latencies, can result in the computing clusters transmitting resource availability information that is outdated by the time it is received by the management module.

Some examples of the present disclosure can overcome one or more of the abovementioned problems by providing a distributed computing environment that can determine (e.g., estimate) the resource availability of its computing clusters based on historical information about resource usage by the computing clusters. The historical information may include statistical information such as statistical distributions relating to replica deployment on the computing clusters, in some examples. The distributed computing environment can then assign a workload to a given computing cluster based on its estimated resource availability. Assigning workloads to computing clusters in this way may reduce or eliminate the need to the rapidly poll the computing clusters, which in turn can reduce or eliminate the associated resource consumption.

As one particular example, a distributed computing environment can include a global workload manager and a workload assignment module. The global workload manager can be configured to assign workloads to computing clusters of the distributed computing environment. The global workload manager can interface with the workload assignment module to determine which computing cluster is to receive a given workload. The workload assignment module can determine which computing cluster is to receive a given workload based on historical information about the resource usage of the computing clusters during a prior timespan. For example, the historical information for a particular computing cluster can include statistical information about replica deployment by the particular computing cluster during the prior timespan. The workload assignment module can apply a predefined policy to the historical information to determine whether the particular computing cluster has sufficient capacity to handle the workload. The predefined policy may be selected (e.g., by a user) from among a group of available policies, such as a first policy for estimating a load on the particular computing cluster under normal conditions, a second policy for estimating a load on the particular computing cluster under worst-case conditions, or third policy that uses a weighted approach for estimating a load on the particular computing cluster. The workload assignment module can repeat the above process for each computing cluster to determine which of the computing clusters has sufficient capacity to handle the workload. If more than one of the computing clusters has sufficient capacity to handle the workload, the workload assignment module may select the computing cluster with the most available capacity to receive the workload. The workload assignment module can then indicate its selected computing cluster to the global workload manager, which can then assign the workload to the selected computing cluster.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a telecommunication system 102 in which computer workloads can be managed according to some aspects of the present disclosure. The telecommunications system 102 can be operated by a telecommunication carrier, such as AT&T® or Verizon®, and house the physical infrastructure for routing telephone calls and data communications between devices. For example, the telecommunications system 102 can include a public switched telephone network ("PSTN") and may have one or more base stations, switches, local exchanges, and core networks for connecting telephone calls between callers and recipients.

The telecommunications system 102 can include any number of computing clusters, such as edge clusters 104a-n. The edge clusters 104a-n are computing clusters located at the physical edges of the telecommunications system 102. Each of the computing clusters can include multiple nodes configured to perform one or more tasks. Examples of the nodes can be physical servers or virtual servers. The nodes of a computing cluster can be connected to one another via one or more networks, such as a local area network.

Some telecommunication systems, such as 5G telecommunication systems, offer the ability to engage in network slicing. Network slicing can enable the multiplexing of virtualized and independent logical networks on the same physical infrastructure, such as the physical infrastructure underlying the telecommunications system 102. In the example shown in FIG. 1, the telecommunication system 102 has three network slices 122a-c formed using nodes of the edge clusters 104a-n, but other examples may include more or fewer network slices formed using more or fewer computing clusters. Each of the network slices 122a-c can serve as a substantially isolated end-to-end network tailored to fulfil diverse requirements requested by a particular application. Network slicing can efficiently allow for a large number of services with very different service level requirements (SLR) to be realized via flexible and scalable network slices that reside on the same network infrastructure. For example, network slicing can allow for multiple service profiles that have different and possible contrasting quality of service (QoS) requirements to be implemented on a common network infrastructure. As one specific example, network slicing can allow for machine-type communication, ultra reliable low latency communication (uRLLC), and enhanced mobile broadband (eMBB) to be implemented using separate network slices on a common network infrastructure.

The nodes of the edge clusters 104a-n can execute software components, which are designated as "SC" in FIG. 1. The software components may perform tasks relating to the network slices 122a-c. For example, edge cluster 104a can execute software component A ("SC_A") to implement a video conferencing service associated with network slice 122a. Edge cluster 104a can also execute software component B ("SC_B") to implement a voice communication service associated with network slice 122b. As another example, edge cluster 104b can execute software component C ("SC_C") and software component D ("SC_D") to implement the video conferencing service associated with network slice 122a. As yet another example, edge cluster 104n can execute software component E ("SC_E") to implement a voice communication service associated with network slice 122b. Edge cluster 104n can also execute software component F ("SC_F") to implement a web browsing service associated with network slice 122c. Of course, other arrangements of software components and network slices are possible.

The edge clusters 104a-n can also include local workload managers 106a-n to manage their local workloads. A local workload manager can be computer software running in a computing cluster for managing (e.g., scheduling) workloads on that cluster's nodes. In the example shown in FIG. 1, the local workload managers 106a-n can each dictate which workloads are executed by which nodes in their corresponding edge cluster. The local workload managers 106a-n may also be capable of scaling up or down computing resources based on their edge cluster's workload. For example, the local workload manager 106a can increase the number of replicas of software component A in the edge cluster 104a in response to an increased workload on the edge cluster 104a, and can decrease the number of replicas of software component A in the edge cluster 104a in response to a decreased workload on the edge cluster 104a.

In some examples, the telecommunication system 102 may need to execute a workload 112 based on one or more interactions with client devices 124. Examples of such a workload 112 may include a video streaming workload, a voice communication workload, a website browsing workload, or a data storage workload. Examples of the client devices 124 may be any suitable user equipment, such as mobile phones, laptop computers, or desktop computers, tablets, or e-readers. In order to execute the workload 112, the telecommunication system 102 may first need to determine which of the edge clusters 104a-n can suitably handle the workload 112. This may be challenging using conventional techniques, especially in circumstances involving network slicing given how computing resources like software replicas are provisioned for the network slices. But some examples of the present disclosure can include a global workload manager 110 and a workload assignment module 108 configured to assist in assigning the workload 112 to a suitable computing cluster.

More specifically, the global workload manager 110 can be computer software that is responsible for managing (e.g., assigning or scheduling) workloads among the computing clusters, such as edge clusters 104a-n. In particular, the global workload manager 110 identify a workload 112 that is to be placed on one of the edge clusters 104a-n. The global workload manager 110 can then transmit a request 114 to the workload assignment module 108 for determining which particular edge cluster is to receive the workload 112. In some examples, the global workload manager 110 may also perform other functions, such as a session management function (SMF) associated with a 5G based architecture.

The workload assignment module 108 can be computer software that is configured to receive the request 114, determine which of the edge clusters 104a-n is to receive the workload 112, and transmit a response 116 back to the global workload manager 110 indicating the particular edge cluster to which to assign the workload 112. The global workload manager 110 can receive the response 116 and assign the workload 112 to that particular edge cluster. For example, the response 116 can indicate that the workload 112 is to be assigned to edge cluster 104a. So, the global workload manager 110 can interact with the local workload manager 106a to assign the workload 112 to edge cluster 104a. This workload assignment represented by a dashed arrow in FIG. 1.

It will be appreciated that although the workload assignment module 108 is shown as being internal to the telecommunication system 102 in FIG. 1, in other examples the workload assignment module 108 may be located outside the telecommunication system 102 and accessible to the global workload manager 110 via one or more networks, such as the Internet. This arrangement may be particularly suitable in circumstances, for example, in which a third party provides access to the workload assignment module 108a via a paid subscription service. Alternatively, the workload assignment module 108 may be part of the global workload manager 110 in some examples.

The workload assignment module 108 can determine which of the edge clusters 104a-n is to receive a workload 112 based on resource-usage information 118a-c provided by the edge clusters 104a-n. In some examples, the resource-usage information 118a-c may be received by the workload assignment module 108 prior to receiving the request 114. For example, the workload assignment module 108 may periodically poll the edge clusters 104a-n to receive such resource-usage information 118a-c. Alternatively, the edge clusters 104a-n may unilaterally transmit such resource-usage information 118a-c at periodic intervals.

In some examples, the resource-usage information 118a-c can include current resource-usage information associated with the edge clusters 104a-c. For example, the resource-usage information 118a can indicate current processor utilization, current memory utilization, or both of these with respect to the edge cluster 104a. Additionally or alternatively, the resource-usage information 118a-c can include historical information indicating prior resource usage by the edge clusters 104a-c in the past. For example, the historical information can indicate prior processor utilization, prior memory utilization, or both of these by the edge cluster 104a at various points in time during a prior timespan. Based on the resource-usage information 118a-c, the workload assignment module 108 can estimate resource usage by the edge clusters 104a-n. The workload assignment module 108 can then assign the workload 112 to an edge cluster 104a having an estimated resource usage that does not exceed a predefined resource-usage threshold 120.

In some examples, the historical information can include statistical information relating to replica deployment by the edge clusters 104a-n during a prior timespan (e.g., a one-month timespan). Replica deployment can refer to the deployment of one or more replicas of a software application by a computing cluster. The statistical information can include one or more statistical distributions, one or more metrics derived from the statistical distribution, or both of these. Examples of such metrics can include a mean, median, or mode of the statistical distribution; an upper percentile value (e.g., $95^{th}$ percentile), lower percentile value (e.g., $5^{th}$ percentile), or other percentile value of the statistical distribution; or any combination of these.

Figure 2:
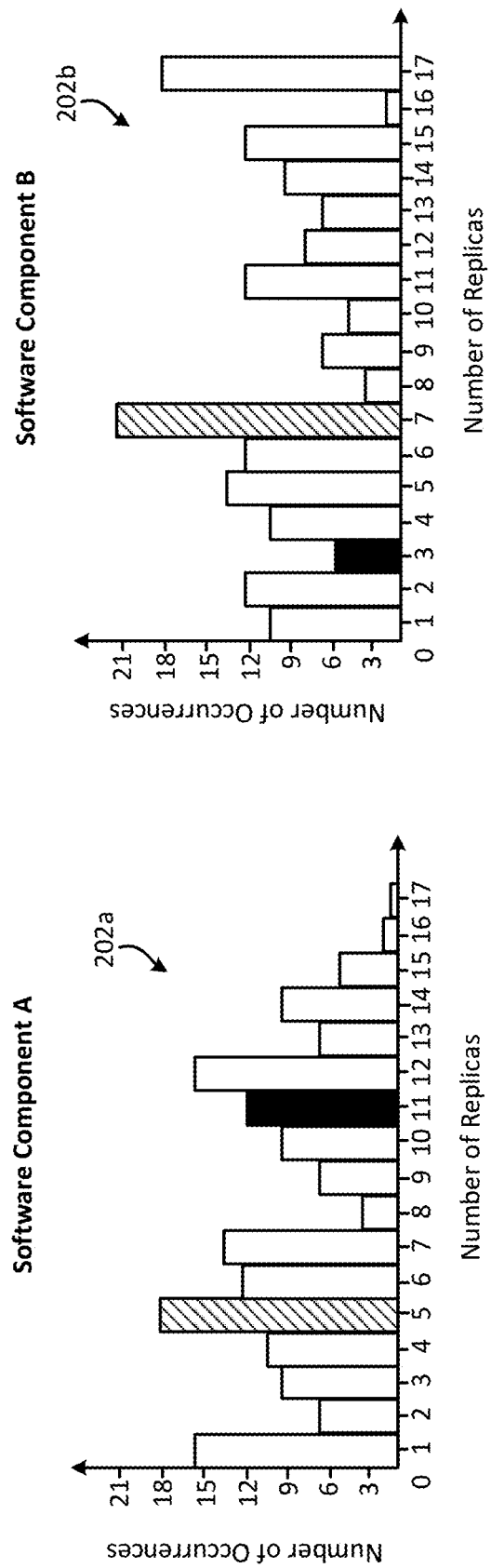
FIG. 2 shows graphs of examples of historical information relating to replica deployment according to some aspects of the present disclosure.

One example of the statistical distributions described above can be the distributions 202a-b shown in FIG. 2. Distribution 202a can specify how many times the edge cluster 104a executed various numbers of replicas of software component A during the prior timespan. For example, the black bar in distribution 202a indicates that the edge cluster 104a executed exactly 11 replicas of software component A roughly 12 times during the prior timespan. As another example, the hashed bar in the distribution 202a indicates that the edge cluster 104a executed exactly five replicas of software component A roughly 18 times during the prior timespan. As is apparent, the number of replicas of software component A executed by the edge cluster 104a varied over the course of the prior timespan. This may be a result of the edge cluster 104a scaling up or down the replica count depending on its workload.

Similarly, distribution 202b can specify how many times the edge cluster 104a executed various numbers of replicas of software component B during the prior timespan. For example, the black bar in distribution 202b indicates that the edge cluster 104a executed exactly three replicas of software component B roughly six times during the prior timespan. As another example, the hashed bar in the distribution 202b indicates that the edge cluster 104a executed exactly seven replicas of software component B roughly 21 times during the prior timespan. As is apparent, the number of replicas of software component B executed by the edge cluster 104a varied over the course of the prior timespan. This may be a result of edge cluster 104a scaling up or down the replica count depending on its workload.

The workload assignment module 108 can receive any number of distributions, associated with any number of software components, as part of the resource-usage information 118a from the edge cluster 104a. The workload assignment module 108 can then determine whether the workload 112 is to be assigned to the edge cluster 104a based on the set of distributions, as described in greater detail below. The workload assignment module 108 can perform a similar process with respect to the other edge clusters 104b-n, to identify which of the edge clusters 104a-n is to receive the workload 112.

More specifically, the workload assignment module 108 can use the resource-usage information 118a-n to estimate (e.g., predict) the resource usage of the edge clusters 104a-n (e.g., at a future point in time). The workload assignment module 108 can estimate the resource usage of the edge cluster 104a-n using one or more policies. A first such policy and can be associated with normal loading conditions at the edge cluster 104a. The first policy can involve determining a mean of the distributions 202a-b, which can indicate the average number of replicas of software components A-B under typical loading conditions. For example, the workload assignment module 108 can determine that the mean of distribution 202a is 7.56 replicas. The workload assignment module 108 can round this value up to 8 replicas, since one cannot have a fraction of a replica. The workload assignment module 108 can also determine that each such replica consumes 100 m of processing power and 100 megabytes (MB) of memory (e.g., random access memory). The workload assignment module 108 can determine this information from a database such as a lookup table, which may or may not be preprogrammed into the workload assignment module 108. Based on this information, the workload assignment module 108 can determine that the edge cluster 104a consumes roughly (100 m*8)=800 m of processing power and (100 MB*8)=800 MB of memory across the 8 replicas of software component A.

The workload assignment module 108 can next perform a similar process for software component B. For example, the workload assignment module 108 can determine that the mean of distribution 202b is 8.79 replicas, which can be rounded to 9 replicas. The workload assignment module 108 can also determine that each such replica consumes 150 m of processing power and 120 megabytes (MB) of memory. From this, the workload assignment module 108 can determine that the edge cluster 104a consumes roughly 1350 m of processing power and 1080 MB of memory across the 9 replicas of software component B.

Next, the workload assignment module 108 can aggregate the processor consumption and memory consumption associated with the replicas of software components A-B, respectively, to arrive at a combined processor consumption of 2150 m and a combined memory consumption of 1880 MB. The workload assignment module 108 can perform a similar process for some or all of the remaining software components at edge cluster 104a, to estimate a combined processor consumption and a combined memory consumption under normal loading circumstances at edge cluster 104a. The workload assignment module 108 can add, to those combined amounts, additional processor consumption and memory consumption associated with the workload 112. The net result can be estimations of processor consumption and memory consumption by the edge cluster 104a under normal loading conditions, assuming that the workload 112 is assigned to that edge cluster 104a.

A second policy and can be associated with higher loading conditions. The second policy can used, for example, to generate a worst case estimation. The second policy can involve determining an upper percentile (e.g., 95%) of the distributions 202a-b, which can indicate the number of replicas of software components A-B under higher loading conditions. For example, the workload assignment module 108 can determine that the 95% of distribution 202a is X replicas. Based on this information, the workload assignment module 108 can determine that the edge cluster 104a consumes roughly (100 m*X) of processing power and (100 MB*X) of memory across the X replicas of software component A under heavier loading conditions. The workload assignment module 108 can next perform a similar process for software component B. For example, the workload assignment module 108 can determine that the 95% percentile of distribution 202b is Y replicas. Based on this information, the workload assignment module 108 can determine that the edge cluster 104a consumes roughly (150 m*Y) of processing power and (120 MB*Y) of memory across the X replicas of software component B under heavier loading conditions.

Next, the workload assignment module 108 can aggregate the processor consumption and memory consumption associated with the replicas of software components A-B to arrive at a combined processor consumption and a combined memory consumption, respectively, under the heavier loading conditions. The workload assignment module 108 can perform a similar process for some or all of the remaining software components at edge cluster 104a, to estimate a combined processor consumption and a combined memory consumption under heavier loading circumstances at edge cluster 104a. The workload assignment module 108 can add, to those combined amounts, additional processor consumption and memory consumption corresponding to the workload 112. The net result can be estimations of processor consumption and memory consumption by the edge cluster 104a under heavier loading conditions, assuming that the workload 112 is assigned to that edge cluster 104a.

A third policy can involve generating a weighted estimation associated with the software components. A weighted estimation can be a weighted sum of (i) the current number of replicas for a software application running on an edge cluster and (ii) a number of replicas derived from a corresponding historical distribution. Examples of the number of replicas can be the mean number of replicas (e.g., as described above with respect to the first policy) or the upper percentile of replicas (e.g., as described above with respect to the second policy). For example, the workload assignment module 108 can receive resource-usage information 118a indicating that there are currently 5 replicas of software component A executing in the edge cluster 104a. The workload assignment module 108 can also analyze distribution 202a to determine that the 95% percentile is 15 replicas. The weighted average of these values can be A*(3 replicas)+B*(15 replicas), where A and B can be weighting coefficients. If each of these values is weighted equally (e.g., 50%), then the weighted average is 0.5*(3 replicas)+0.5*(15 replicas)=9 replicas. Of course, other weighting schemes are possible and, in some examples, the weights can change over time. For example, the weight given to the current replica number can decrease over time and the weight given to the historical distribution percentile can increase over time, which may yield a more accurate estimate of replica usage. Once the weighted number of replicas is determined for software component A, a similar process can be performed for software component B, along with some or all of the other software components on the edge cluster 104a. From this point, the remainder of the process can be the same as described above, for determining estimations of processor consumption and memory consumption by the edge cluster 104a.

After applying one or more of the policies described above, the workload assignment module 108 can determine whether the estimated processor consumption is greater than a predefined processor-usage threshold, whether the estimated memory consumption is greater than a predefined memory-usage threshold, or both of these. Either or both of these resource-usage thresholds 120 can be specific to the edge cluster 104a. For example, each edge clusters 104a-n may have one or more corresponding resource-usage thresholds 120 that may be preselected by a user and that may be different from other resource-usage thresholds associated with the other edge clusters 104a-n. If the estimated processor consumption is greater than the processor-usage threshold, then the workload assignment module 108 can determine that the edge cluster 104a is unsuitable for the workload 112. Additionally or alternatively, if the estimated memory consumption is greater than the memory-usage threshold, then the workload assignment module 108 can determine that the edge cluster 104a is unsuitable for the workload 112. If neither of these conditions is satisfied, then the workload assignment module 108 can determine that the edge cluster 104a is suitable for the workload 112. While the above examples involve processor consumption and memory consumption, this is for illustrative purpose and not intended to be non-limiting. In other examples, the workload assignment module 108 may estimate the consumption of other types of computing resources for comparison to a corresponding resource-usage threshold.

The above processes can be repeated for some or all of the edge clusters 104*a-c* to determine which of the edge clusters 104*a-c* have sufficient capacity to handle the workload 112. If the workload assignment module 108 determines that two or more of the edge clusters 104*a-c* are suitable for the workload 112, the workload assignment module 108 can select whichever of the edge clusters 104*a-c* has the most capacity available. For example, the workload assignment module 108 can determine that there is a first difference between an estimated processor consumption associated with edge cluster 104*a* and a processor-usage threshold. The workload assignment module 108 can also determine that there is a second difference between an estimated processor consumption associated with edge cluster 104*b* and the processor-usage threshold. If the first difference is greater than the second difference, then the workload assignment module 108 can select the edge cluster 104*a* to receive the workload 112. This selection is shown in FIG. 1 by a bold border around edge cluster 104*a*. The workload assignment module 108 can then transmit the response 116 to the global workload manager 110 indicating that the edge cluster 104*a* is to be assigned the workload 112.

Although a certain number and arrangement of components in shown in FIG. 1, this is intended to be illustrative and non-limiting. Other examples may include more components, fewer components, different components, or a different arrangement of the components shown in FIG. 1. For instance, similar principles can be applied to one or more non-edge clusters of the telecommunication system 102. Additionally, similar principles can be applied outside of the telecommunication context to other types of distributed computing environments. It will further be appreciated that although FIG. 1 depicts the global workload manager 110 and workload assignment module 108 as being outside the edge clusters 104*a-n*, in other examples either or both of these components may be internal to one or more of the edge clusters 104*a-n*.

Figure 3:
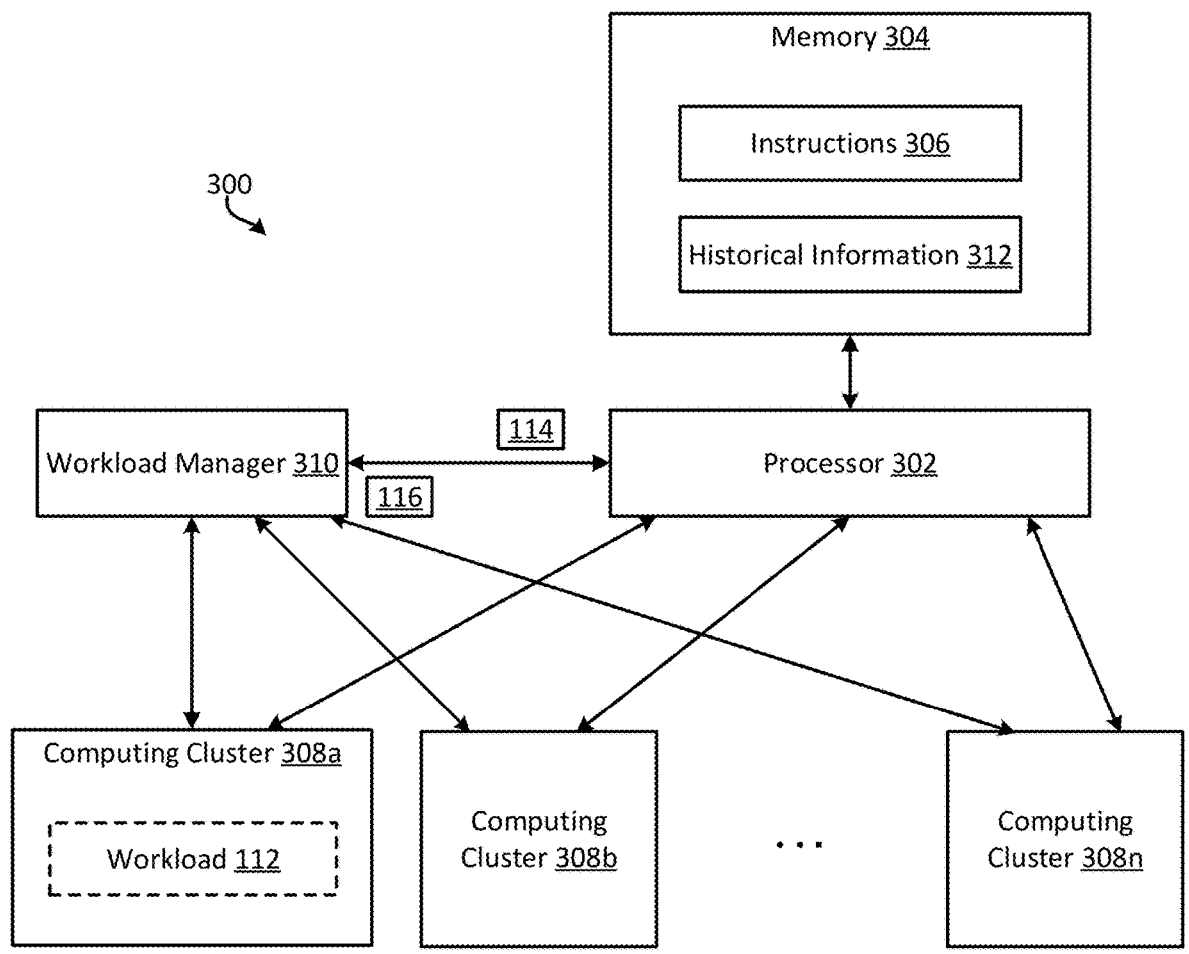
FIG. 3 shows a block diagram of an example of a system for managing computer workloads according to some aspects of the present disclosure.

FIG. 3 shows a block diagram of an example of a system 300 for managing computer workloads according to some aspects of the present disclosure. The system 300 includes a processor 302 communicatively coupled to a memory 304. In some examples, the processor 302 and the memory 304 can be part of the same computing device. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. The instructions 306 may include processor-specific instructions generated by a compiler or an interpreter from code written in any suitable computer-programming language, such as C, C++, C#, etc. In some examples, the instructions 306 can correspond to the workload assignment module 108 of FIG. 1.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

The processor 302 can execute the instructions 306 to perform operations. For example, the processor 302 can receive a request 114 from a workload manager 310 for identifying a computing cluster to which to assign a workload 112. An example of the workload manager 310 can be the global workload manager 110 of FIG. 1. Next, the processor 302 can determine that the workload 112 is to be assigned to a particular computing cluster 308*a* among a plurality of computing clusters 308*a-n* based on historical information 312. In some examples, the plurality of computing clusters 308*a-n* can be an edge clusters, such as edge clusters 104*a-n* of FIG. 1. And in some examples, the historical information 312 can relate to replica deployment by the particular computing cluster 308*a* during a prior timespan. For instance, the historical information 312 may include statistical distributions associated with replica deployment by the particular computing cluster 308*a* during the prior timespan. The processor 302 can then transmit a response 116 to the workload manager 310 for causing the workload manager 310 to assign the workload 112 to the particular computing cluster 308*a*.

Figure 4:
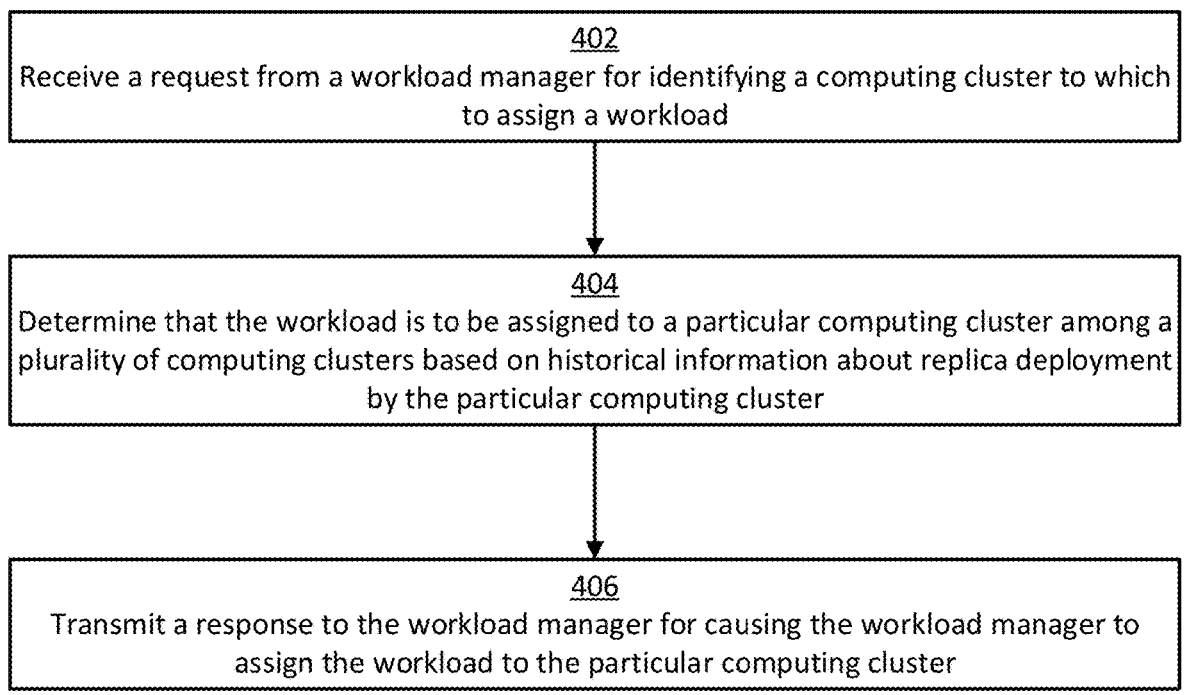
FIG. 4 shows a flow chart of an example of a process for managing computer workloads according to some aspects of the present disclosure.

In some examples, the processor 302 can implement the process shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, the processor 302 receives a request 114 from a workload manager 310 for identifying a computing cluster to which to assign a workload 112. The processor 302 can receive the request via one or more networks, such as an internal network of a telecommunication system.

In block 404, the processor 302 determines that the workload 112 is to be assigned to a particular computing cluster 308*a* among a plurality of computing clusters 308*a-n* based on historical information 312, which may be data about replica deployment by the particular computing cluster 308*a*. For example, the processor 302 can estimate resource usage by the particular computing cluster 308*a* based on the historical information 312. The processor 302 can then determine that the workload 112 is to be assigned to the particular computing cluster 308*a* based on the estimated resource usage.

Figure 5:
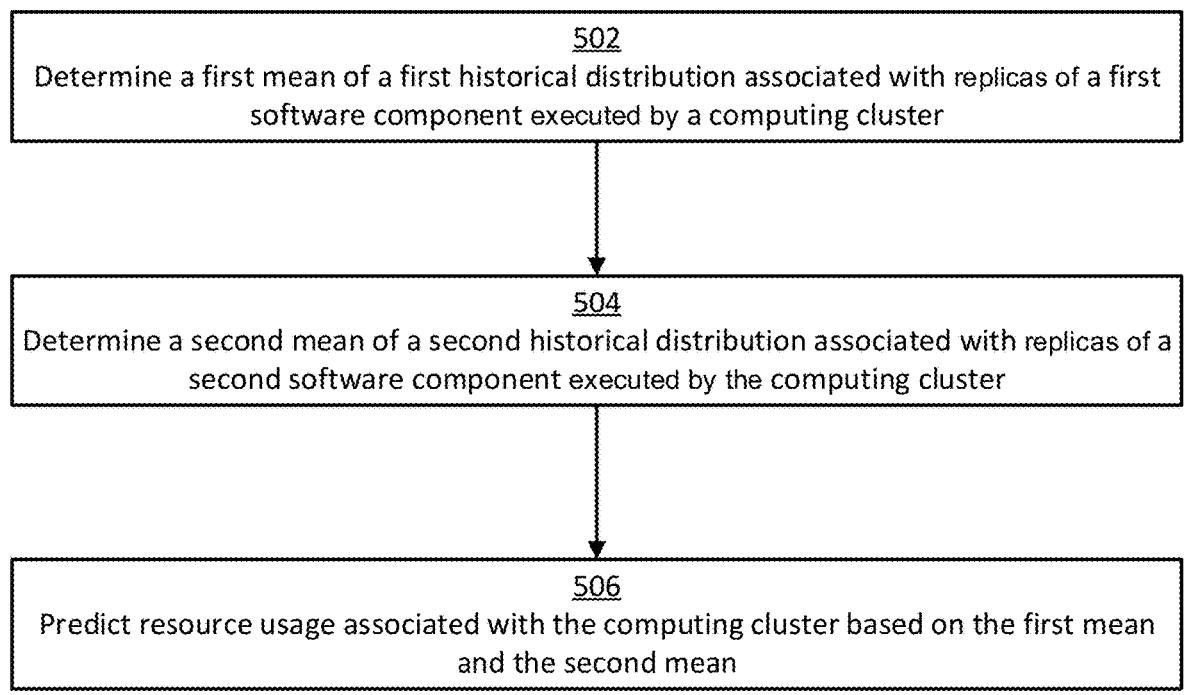
FIG. 5 shows a flow chart of an example of a process for estimating resource usage by a computing cluster according to some aspects of the present disclosure.

In some examples, the processor 302 can estimate the resource usage by executing the process shown in FIG. 5. At block 502, the processor 302 determines a first mean of a first historical distribution associated with replicas of a first software component executed by computing cluster 308*a*. An example of the first historical distribution can be distribution 202*a* of FIG. 2. At block 504, the processor 302 determines a second mean of a second historical distribution associated with replicas of a second software component executed by the computing cluster 308*a*. An example of the second historical distribution can be distribution 202*b* of FIG. 2. At block 506, the processor 302 estimates resource usage associated with the computing cluster 308*a* based on the first mean and the second mean. Although the example shown in FIG. 5 relates to determining mean values, any other suitable statistical measure can be determined additionally or alternatively to mean values.

Figure 6:
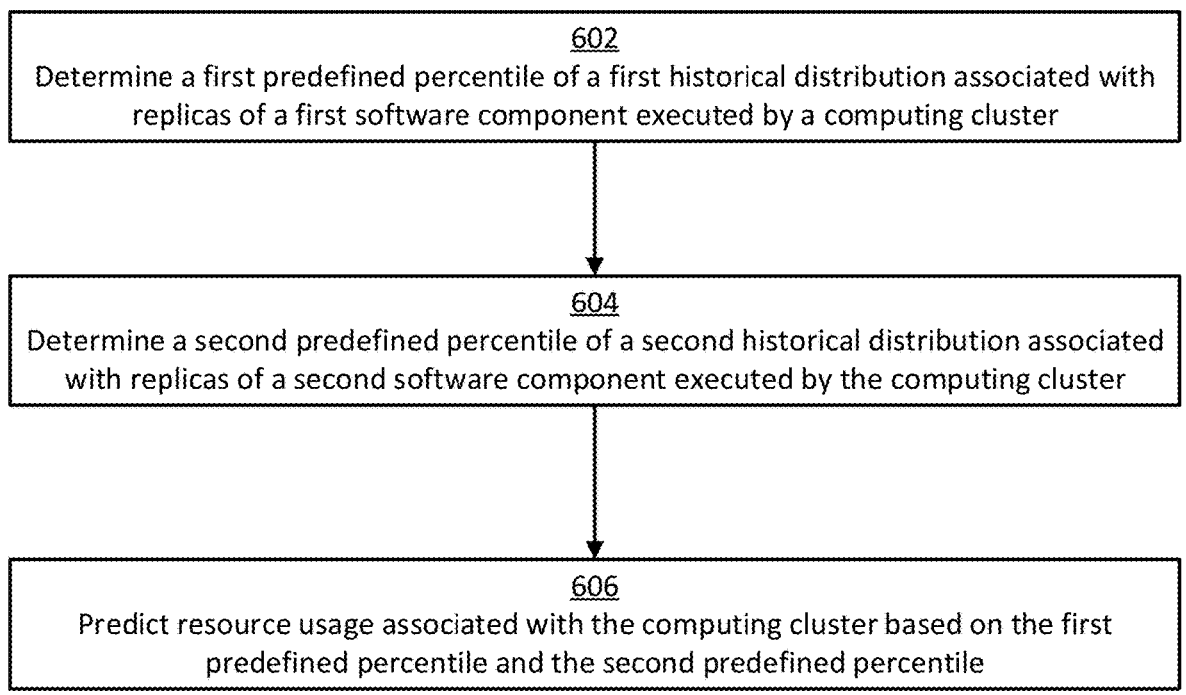
FIG. 6 shows a flow chart of another example of a process for estimating resource usage by a computing cluster according to some aspects of the present disclosure.

Additionally or alternatively, the processor 302 can estimate the resource usage by executing the process shown in FIG. 6. Referring now to FIG. 6, at block 602, the processor 302 determines a first predefined percentile (e.g., a $90^{th}$ percentile) of a first historical distribution associated with replicas of a first software component executed by a computing cluster 308a. An example of the first historical distribution can be distribution 202a of FIG. 2. At block 604, the processor 302 determines a second predefined percentile of a second historical distribution associated with replicas of a second software component executed by the computing cluster 308a. An example of the second historical distribution can be distribution 202b of FIG. 2. At block 606, the processor 302 estimates resource usage associated with the computing cluster 308a based on the first predefined percentile and the second predefined percentile.

Referring now back to FIG. 4, in block 406, the processor 302 transmits a response 116 to the workload manager 310 for causing the workload manager 310 to assign the workload 112 to the particular computing cluster 308a. The workload manager 310 can receive the response 116 and assign the workload 112 to the particular computing cluster 308a accordingly. In some examples, the workload manager 310 can assign the workload 112 to the particular computing cluster 308a by transmitting the workload 112 to the particular computing cluster 308a. In other examples, the workload manager 310 can assign the workload 112 to the particular computing cluster 308a by communicating with one or more computing devices located outside the particular computing cluster 308a, which in turn can transmit the workload 112 to the particular computing cluster 308a. In still other examples, the workload manager 310 can assign the workload 112 to the particular computing cluster 308a by updating an assignment flag in a database. Any suitable technique or combination of techniques may be used to assign the workload 112 to the particular computing cluster 308a.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory including instructions for a workload assignment module, the instructions being executable by the processor for causing the processor to:
receive a request from a workload manager for identifying a computing cluster to which to assign a workload;
receive historical information from a particular computing cluster, the historical information including a set of statistical distributions associated with a set of software components executed by the particular computing cluster during a prior timespan, wherein each statistical distribution in the set of statistical distributions indicates how many times the particular computing cluster executed different numbers of replicas of an associated software component during the prior timespan;
determine that the workload is to be assigned to the particular computing cluster among a plurality of computing clusters based on a metric derived from the set of statistical distributions in the historical information; and
transmit a response to the workload manager for causing the workload manager to assign the workload to the particular computing cluster.

2. The system of claim 1, wherein the historical information includes statistical information about replicas of a software component deployed by the particular computing cluster during the prior timespan.

3. The system of claim 2, wherein the software component is a serverless function or a microservice.

4. The system of claim 1, wherein the plurality of computing clusters are edge clusters at physical edges of a distributed computing environment.

5. The system of claim 1, wherein the workload manager is part of a telecommunication infrastructure that includes the plurality of computing clusters, and wherein the workload assignment module is external to the telecommunication infrastructure and in communication with the workload manager via the Internet.

6. The system of claim 1, wherein the instructions are further executable by the processor for causing the processor to:
estimate resource usage by the particular computing cluster based on the workload and the metric; and
select the particular computing cluster from among the plurality of computing clusters in response to determining that the estimated resource usage is less than a resource-usage threshold for the particular computing cluster.

7. The system of claim 6, wherein the instructions are further executable by the processor for causing the processor to estimate the resource usage associated with the particular computing cluster by:
determining a first mean of a first statistical distribution of the set of statistical distributions;
determining a second mean of a second statistical distribution of the set of statistical distributions; and
estimating the resource usage based on the first mean and the second mean.

8. The system of claim 6, wherein the instructions are further executable by the processor for causing the processor to estimate the resource usage associated with the particular computing cluster by:
determining a first predefined percentile of a first statistical distribution of the set of statistical distributions;
determining a second predefined percentile of a second statistical distribution of the set of statistical distributions; and
estimating the resource usage based on the first predefined percentile and the second predefined percentile.

9. The system of claim 1, wherein a statistical distribution of the set of statistical distributions corresponds to a particular software component, the statistical distribution including a first data value indicating a first number of times in which a first number of replicas of the particular software component concurrently executed in the particular computing cluster during the prior timespan, and the statistical distribution including a second data value indicating a second number of times in which a second number of replicas of the particular software component concurrently executed in the particular computing cluster during the prior timespan.

10. A method comprising:
receiving, by a processor, a request from a workload manager for identifying a computing cluster to which to assign a workload;
receiving, by the processor, historical information from a particular computing cluster, the historical information including a set of statistical distributions associated with a set of software components executed by the particular computing cluster during a prior timespan, wherein each statistical distribution in the set of statistical distributions indicates how many times the particular computing cluster executed different numbers of replicas of an associated software component during the prior timespan;
determining, by the processor, that the workload is to be assigned to the particular computing cluster among a plurality of computing clusters based on a metric derived from the set of statistical distributions in the historical information; and
transmitting, by the processor, a response to the workload manager for causing the workload manager to assign the workload to the particular computing cluster.

11. The method of claim 10, wherein the historical information indicates statistical information about replicas of a software component deployed by the particular computing cluster during the prior timespan.

12. The method of claim 11, wherein the software component is a serverless function or a microservice.

13. The method of claim 10, wherein the plurality of computing clusters are edge clusters at physical edges of a distributed computing environment.

14. The method of claim 10, further comprising:
estimating, by the processor, resource usage by the particular computing cluster based on the workload and the metric; and
selecting, by the processor, the particular computing cluster from among the plurality of computing clusters in response to determining that the estimated resource usage is less than a resource-usage threshold for the particular computing cluster.

15. The method of claim 14, further comprising estimating the resource usage associated with the particular computing cluster by:
determining a first mean of a first statistical distribution of the set of statistical distributions;
determining a second mean of a second statistical distribution of the set of statistical distributions; and
estimating the resource usage based on the first mean and the second mean.

16. The method of claim 14, further comprising estimating the resource usage associated with the particular computing cluster by:
determining a first predefined percentile of a first statistical distribution of the set of statistical distributions;
determining a second predefined percentile of a second statistical distribution of the set of statistical distributions; and
estimating the resource usage based on the first predefined percentile and the second predefined percentile.

17. The method of claim 10, wherein a statistical distribution of the set of statistical distributions corresponds to a particular software component, the statistical distribution including a first data value indicating a first number of times in which a first number of replicas of the particular software component concurrently executed in the particular computing cluster during the prior timespan, and the statistical distribution including a second data value indicating a second number of times in which a second number of replicas of the particular software component concurrently executed in the particular computing cluster during the prior timespan.

18. A non-transitory computer-readable medium comprising program code that is executable by a processor for causing the processor to:
receive a request from a workload manager for identifying a computing cluster to which to assign a workload;
receive historical information from a particular computing cluster, the historical information including a set of statistical distributions associated with a set of software components executed by the particular computing cluster during a prior timespan, wherein each statistical distribution in the set of statistical distributions indicates how many times the particular computing cluster executed different numbers of replicas of an associated software component during the prior timespan;
determine that the workload is to be assigned to the particular computing cluster among a plurality of computing clusters based on a metric derived from the set of statistical distributions in the historical information; and
transmit a response to the workload manager for causing the workload manager to assign the workload to the particular computing cluster.

19. The non-transitory computer-readable medium of claim 18, further comprising program code that is executable by the processor for causing the processor to:
estimate resource usage by the particular computing cluster based on the workload and the metric; and
select the particular computing cluster from among the plurality of computing clusters in response to determining that the estimated resource usage is less than a resource-usage threshold for the particular computing cluster.

20. The non-transitory computer-readable medium of claim 18, wherein a statistical distribution of the set of statistical distributions corresponds to a particular software component, the statistical distribution including a first data value indicating a first number of times in which a first number of replicas of the particular software component concurrently executed in the particular computing cluster during the prior timespan, and the statistical distribution including a second data value indicating a second number of times in which a second number of replicas of the particular software component concurrently executed in the particular computing cluster during the prior timespan.

* * * * *